(12) United States Patent
Starkey et al.

(10) Patent No.: US 10,220,556 B2
(45) Date of Patent: Mar. 5, 2019

(54) MOLDED UNDERCUT RELEASE APPARATUS

(71) Applicant: PROGRESSIVE COMPONENTS INTERNATIONAL CORPORATION, Wauconda, IL (US)

(72) Inventors: Glenn Starkey, Wauconda, IL (US); Kenneth Rumore, Wauconda, IL (US); Kevin Kelly, Island Lake, IL (US)

(73) Assignee: PROGRESSIVE COMPONENTS INTERNATIONAL CORPORATION, Wauconda, IL (US)

( * ) Notice: Subject to any disclaimer, the term of this patent is extended or adjusted under 35 U.S.C. 154(b) by 375 days.

(21) Appl. No.: 15/180,958

(22) Filed: Jun. 13, 2016

(65) Prior Publication Data

US 2017/0355118 A1 Dec. 14, 2017

(51) Int. Cl.
  *B29C 45/44* (2006.01)
  *B29C 45/72* (2006.01)
  *B29C 45/73* (2006.01)

(52) U.S. Cl.
  CPC .......... *B29C 45/4435* (2013.01); *B29C 45/44* (2013.01); *B29C 45/72* (2013.01); *B29C 45/7312* (2013.01)

(58) Field of Classification Search
  CPC ............................ B29C 45/4435; B29C 45/44
  See application file for complete search history.

(56) References Cited

U.S. PATENT DOCUMENTS

| | | |
|---|---|---|
| 4,306,851 A | 12/1981 | Thune |
| 4,765,585 A | 8/1988 | Wieder |
| 4,854,849 A | 8/1989 | Sudo |
| 5,137,442 A | 8/1992 | Starkey |
| 5,281,127 A | 1/1994 | Ramsey |
| 5,316,467 A | 5/1994 | Starkey |
| 5,551,864 A | 9/1996 | Boskovic |

(Continued)

FOREIGN PATENT DOCUMENTS

| | | |
|---|---|---|
| EP | 2286974 A1 | 2/2011 |
| JP | 2523093 B2 | 8/1996 |

(Continued)

OTHER PUBLICATIONS

Cumsa, Cumsa General Catalog: Innovative Solutions for Your Molds, "Undercuts—General Catalog, Undercut Base Unit," Barcelona, Spain, 2016, Chapter 2, p. 26 (3 pages).

(Continued)

*Primary Examiner* — Timothy Kennedy
(74) *Attorney, Agent, or Firm* — Pauley Erickson & Kottis

(57) ABSTRACT

A module or unit manufactured allowing simplified installation of a lifter rod assembly of a core lifter apparatus for a mold for molding plastic parts. In some embodiments, a slide is movably mounted with respect to a retainer and/or a gib, so that the retainer attached to the lifter rod can be moved in a linear direction and a rotational direction to provide free motion and reduce wear and breakage due to uneven ejector plate movement during production cycling of the mold. In some embodiments, the slide has one or more spring-loaded devices that hold the retainer in a particular position with respect to the slide, positioned to receive the lifter rod during mold assembly. In some embodiments, the retainer accommodates connections and coiled hoses for delivering cooling fluid to an internally cooled lifter rod.

18 Claims, 16 Drawing Sheets

(56) References Cited

U.S. PATENT DOCUMENTS

| | | | |
|---|---|---|---|
| 5,603,968 | A | 2/1997 | Tajiri et al. |
| 5,773,048 | A | 6/1998 | Ramsey |
| 5,814,357 | A | 9/1998 | Boskovic |
| 6,143,227 | A | 11/2000 | Heiden et al. |
| 6,491,513 | B1 | 12/2002 | Schneider |
| 6,537,053 | B1 | 3/2003 | Watkins |
| 6,601,819 | B2 | 8/2003 | Mizukusa |
| 6,655,952 | B1 | 12/2003 | Kraft |
| 6,749,420 | B2 | 6/2004 | Navarra Pruna |
| 6,824,376 | B2 | 11/2004 | Muller |
| 6,872,350 | B2 | 3/2005 | Swartz |
| 7,435,079 | B2 | 10/2008 | Wang et al. |
| 7,766,644 | B2 | 8/2010 | Li et al. |
| 8,029,267 | B2 | 10/2011 | Takao |
| 8,033,810 | B2 | 10/2011 | Helenius et al. |
| 2006/0186575 | A1 | 8/2006 | Prskalo |
| 2011/0262583 | A1 | 10/2011 | Lin |

FOREIGN PATENT DOCUMENTS

| | | |
|---|---|---|
| JP | HO8229996 A | 9/1996 |
| KR | 100793412 B1 | 1/2008 |

OTHER PUBLICATIONS

PCT International Search Report, Form PCT/ISA/210, dated Aug. 4, 2017, (2 pages).

PCT Written Opinion of the International Searching Authority, Form PCT/ISA/237, dated Aug. 4, 2017, (9 pages).

Pruden, Trevor, "A New Approach to Designing Lifter Cores: Dual-Rod Design," Oct. 1, 2007, (4 pages).

MOLDED UNDERCUT RELEASE APPARATUS

BACKGROUND OF THE INVENTION

Field of the Invention

This invention relates to a module or unit for mounting a lifter rod or blade to mold and release molded undercuts.

Discussion of Related Art

Conventional internal core lifter devices include lifter rods that are internally cooled with coolant that flows through channels formed within the lifter rods.

Known internal core lifter devices include an internal core blade having one end cooperating with mold surfaces for molding and ejecting plastic parts, and having an opposite end pivotally mounted at a predetermined molding angle, in a range of angles, of the mold apparatus. It is known to pivotally mount the opposite end of the core blade for pivoting about multiple axes and also to provide a support for mounting a coupling to the mold apparatus to move the one end of the core blade as the mold apparatus operates mold halves between open and closed positions. It is also known for the core blade to pivot about the coupling in a plane aligned with a linear travel of the lower end of the core blade along the support, and if transverse loads are applied to the core blade it is known that the core blade can also pivot in a second plane, at an angle to the first plane, to prevent binding of the core blade and coupling relative to the support.

Starkey, U.S. Pat. Nos. 5,137,442 and 5,316,467 each teaches internal core lifter apparatuses, with multiple axes compensation features. The entire teachings and disclosure of each of Starkey, U.S. Pat. Nos. 5,137,442 and 5,316,467, and any related United States Patent and/or Patent Application is incorporated by reference into this specification.

SUMMARY OF THE INVENTION

The apparatus and method of this invention can be manufactured and marketed as a module or unit that can be easily installed, repaired and/or replaced, particularly by one user or person versus two required at each the front and the back of the mold during assembly.

In some embodiments of this invention, a retainer is movably mounted with respect to an ejector plate so that the retainer to which a lifter rod is attached can move in a linear direction as well as a rotational direction. The linear and rotational movement allow the lifter rod to move with relatively free motion to compensate for any uneven movement by the ejector plate, for example, and thus prevent breakage in the mold and also extend the life of corresponding mold elements.

According to some embodiments of this invention, one spring loaded device is used to hold a core rod retainer in a specific position at a predetermined set angle. In other embodiments of this invention, another spring loaded device is used to hold the position of the core rod retainer during assembly to the location it will later be in when the ejector plates are retracted and the mold is closed during injection. The securing of both the retainer angle and the retainer's location, readies the entire unit for receiving the lifter rod during mold assembly, versus one person loading the rod and a second person moving and adjusting the retainer's location.

In some embodiments of this invention, the retainer has hoses attached to the retainer body to supply fluid, such as cooling fluid, to an internally cooled lifter rod. In some embodiments of this invention, the hoses are coiled hoses and are able to change length as a mold's ejector plates move forward and back and the retainer travels perpendicular.

Other features and advantages of this invention will be apparent from the following detailed description taken in conjunction with the following Figures, wherein like reference numerals represent like features.

DETAILED DESCRIPTION OF THE INVENTION

Figure 1:
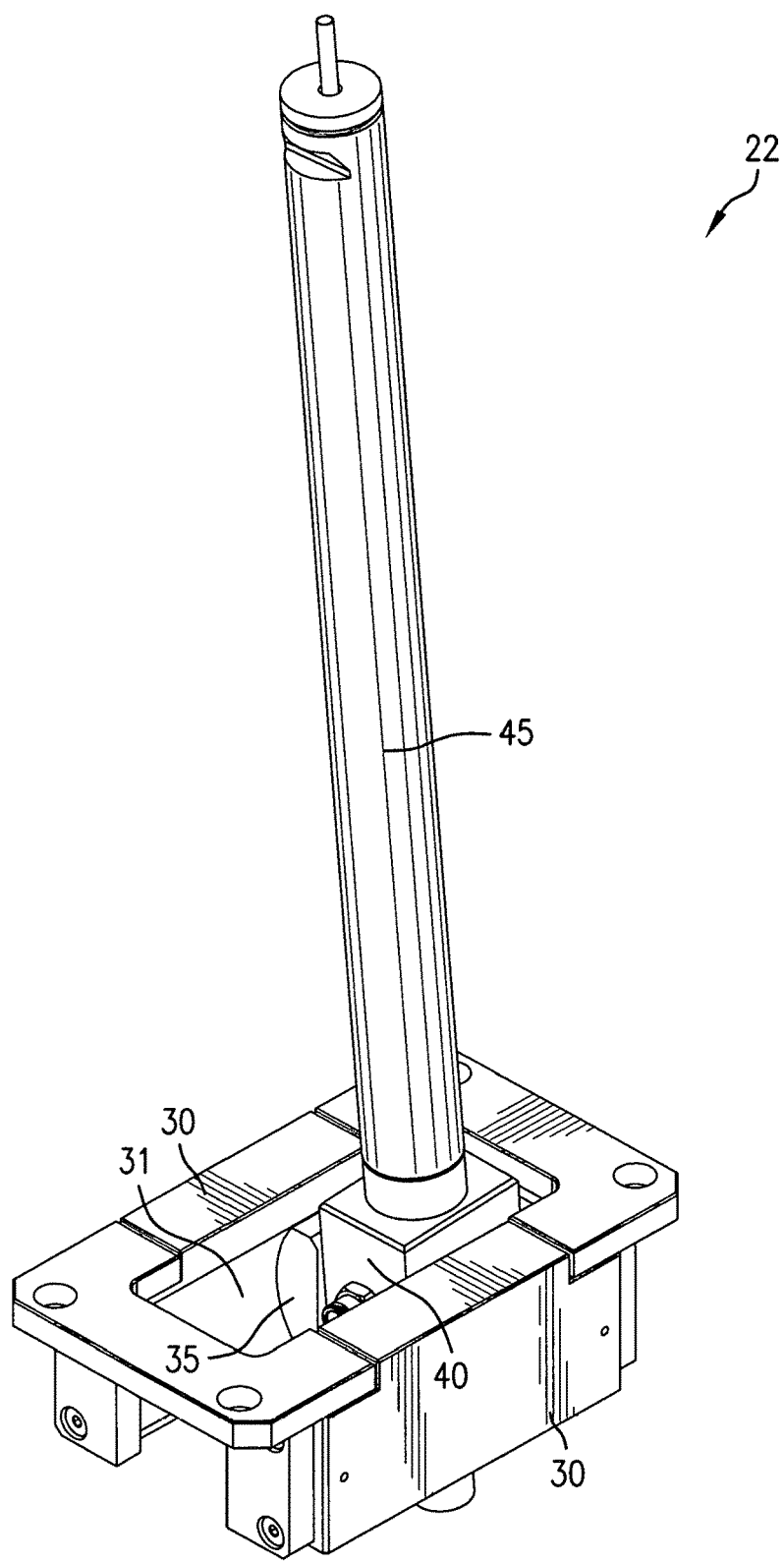
FIG. 1 shows a perspective view of a module or unit of a core lifter apparatus, in the back position when a mold's ejector plates are retracted during the mold closed/injection stage of the cycle, according to one embodiment of this invention.
Figure 7:
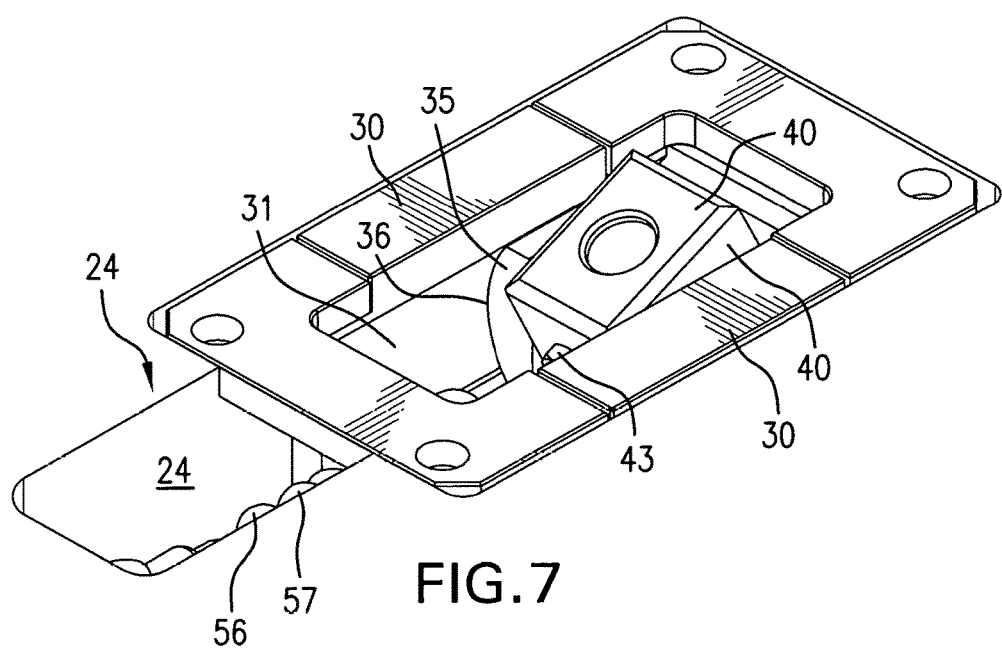
FIG. 7 shows a perspective view of a module or unit of a core lifter apparatus mounted in an ejector plate after the angle has been set and secured, and in the back position, according to one embodiment of this invention.
Figure 8:
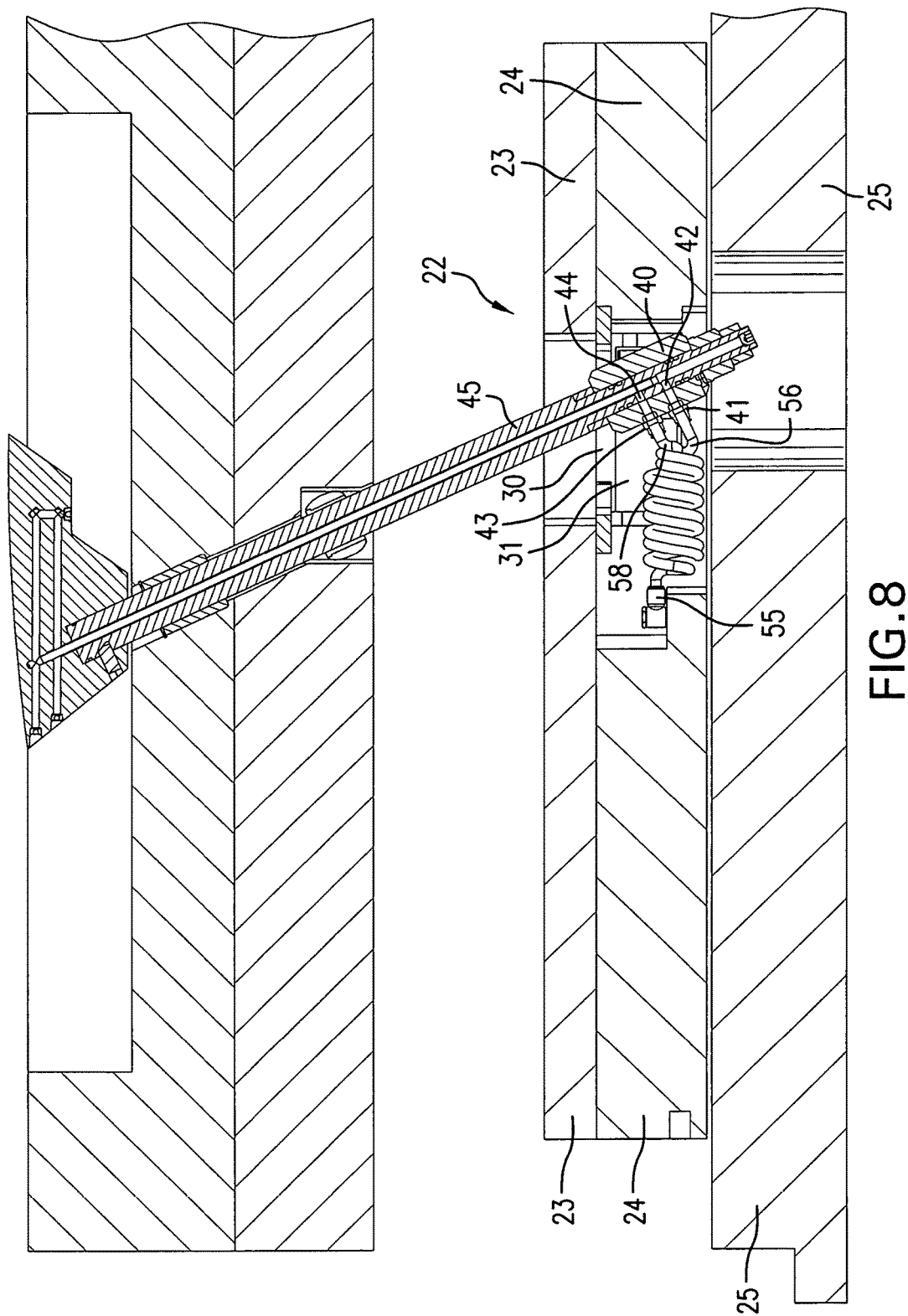
FIG. 8 shows a sectional view of a core lifter apparatus, in the back position, according to one embodiment of this invention.

FIG. 1 shows a module or unit of core lifter apparatus 22 which is often manufactured for in ejector plate 24, such as shown in FIG. 7. FIG. 8 shows the module and how it is positioned with respect to pin plate 23, ejector plate 24 and clamp plate 25, in some embodiments of this invention.

Figure 2:
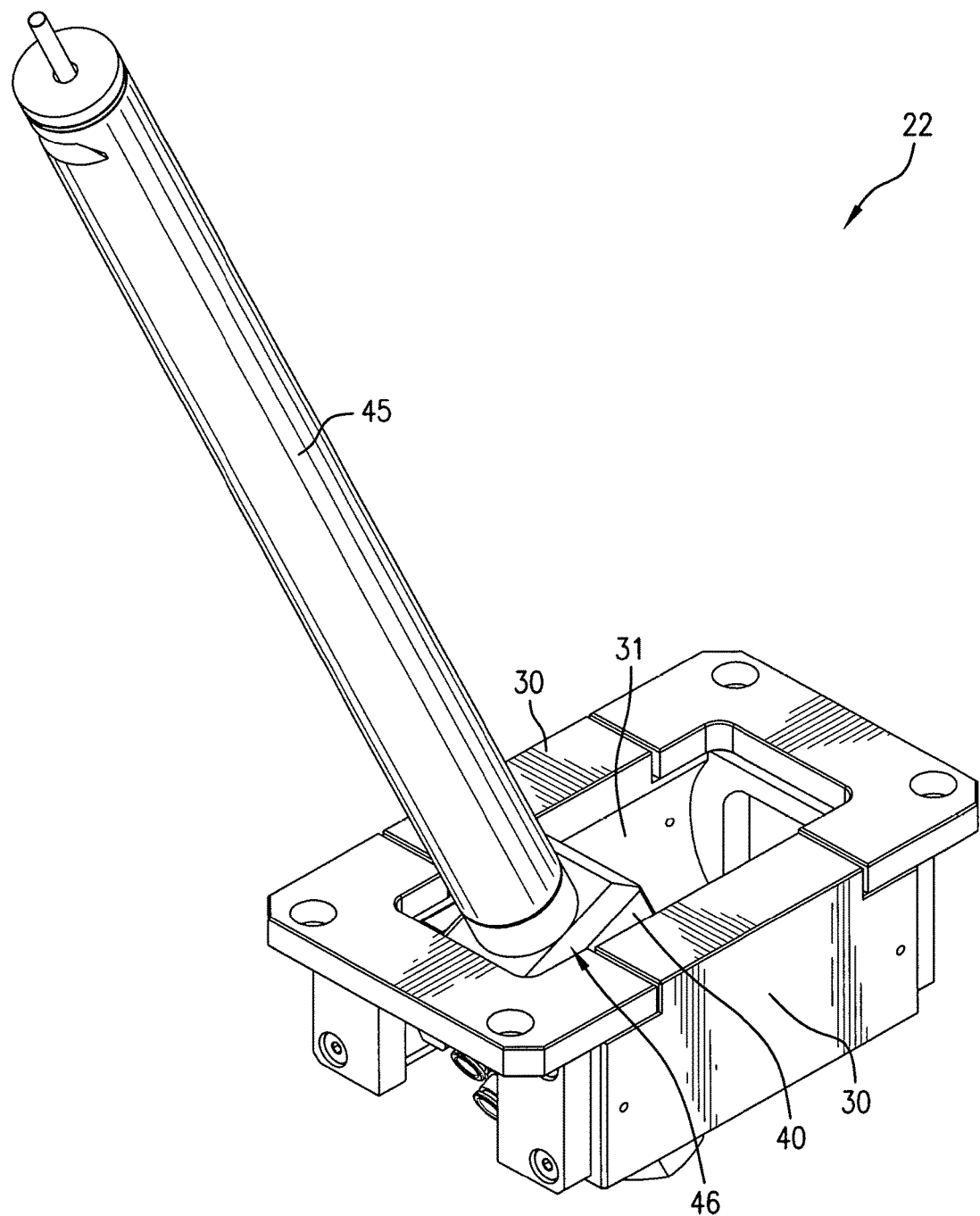
FIG. 2 shows a perspective view of a module or unit of a core lifter apparatus, in a front position after molded part ejection, according to one embodiment of this invention.
Figure 3:
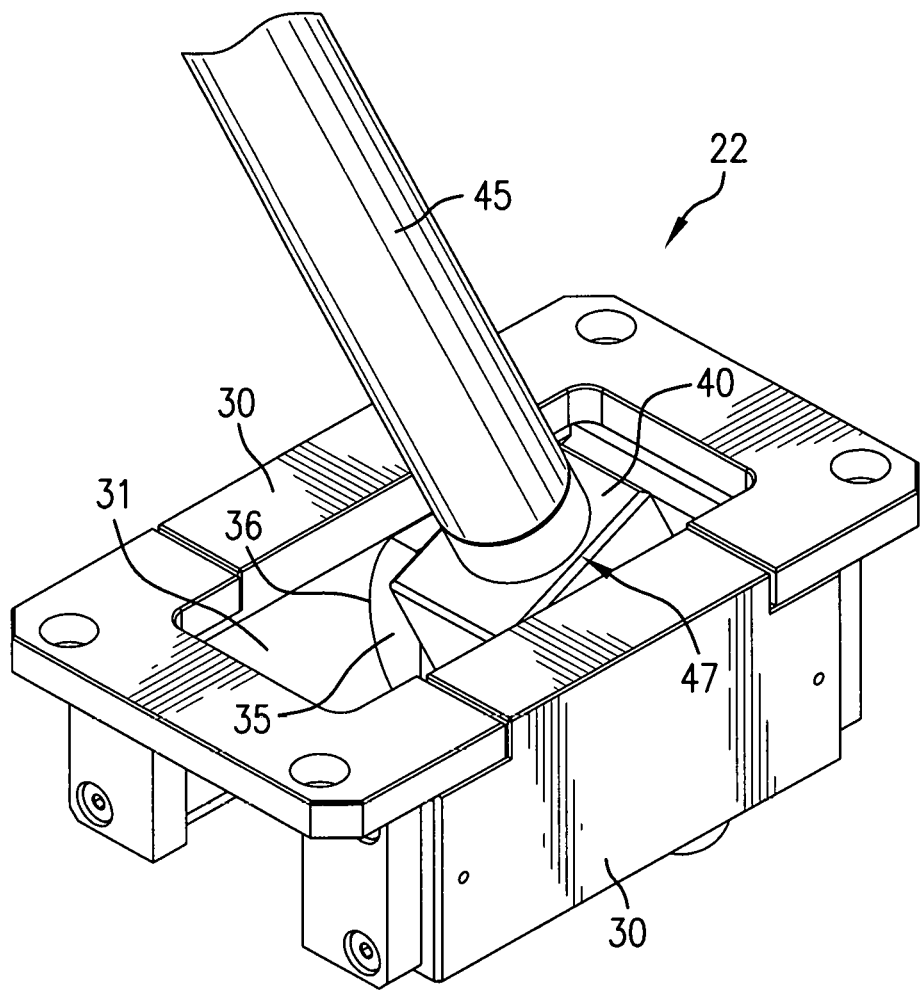
FIG. 3 shows a perspective view of the module or unit shown in FIG. 2, but in the back position.

During use, for example, FIGS. 2 and 3 show lifter rod 45 operating between forward or front position 46, such as shown in FIG. 2, and back or rear position 47, such as shown in FIG. 3. In some embodiments of this invention, as lifter rod 45 moves with respect to ejector plate 24, for example, the module of this invention swivels, slides and/or otherwise moves to accommodate and/or compensate for any uneven movement of ejector plate 24 and/or any other related element or corresponding part. In some embodiments of this invention, the module and/or lifter rod 45 moves with a higher degree of freedom of motion and thus reduces mechanical wear and/or breakage of mold pieces.

FIGS. 1-5 show different arrangements of retainer 40 mounted between two slides 35, according to different embodiments of this invention. In other embodiments of this invention, retainer 40 can be mounted to only one slide 35 or can be mounted to more than two slides 35. As shown in FIGS. 1-5, one retainer 40, which can also be referred to as a trunnion, a trunnion base, a block, a retainer block and/or any other suitable element, is formed by one unitary or integrated element but other embodiments can have retainer 40 formed by more than one element or piece. In some embodiments of this invention, retainer 40 comprises inlet 41 and outlet 43 for passing a cooling fluid, for example, and also has a suitable through hole, threaded or non-threaded, or other void to accommodate attachment of lifter rod 45.

In some embodiments according to this invention, gib 30 is mounted, secured and/or otherwise attached directly to or indirectly with respect to ejector plate 24, such as shown in FIG. 7. Also as shown in FIG. 7, according to some embodiments of this invention, gib 30 is further secured and/or mounted to ejector plate 24 with a top gib holding the unit to ejector plate 24 yet allowing it to laterally shift to compensate for any uneven movement of ejector plate 24. FIG. 8 shows a sectional view of core lifter apparatus 22 in the back position according to some embodiments of this invention.

Figure 4:
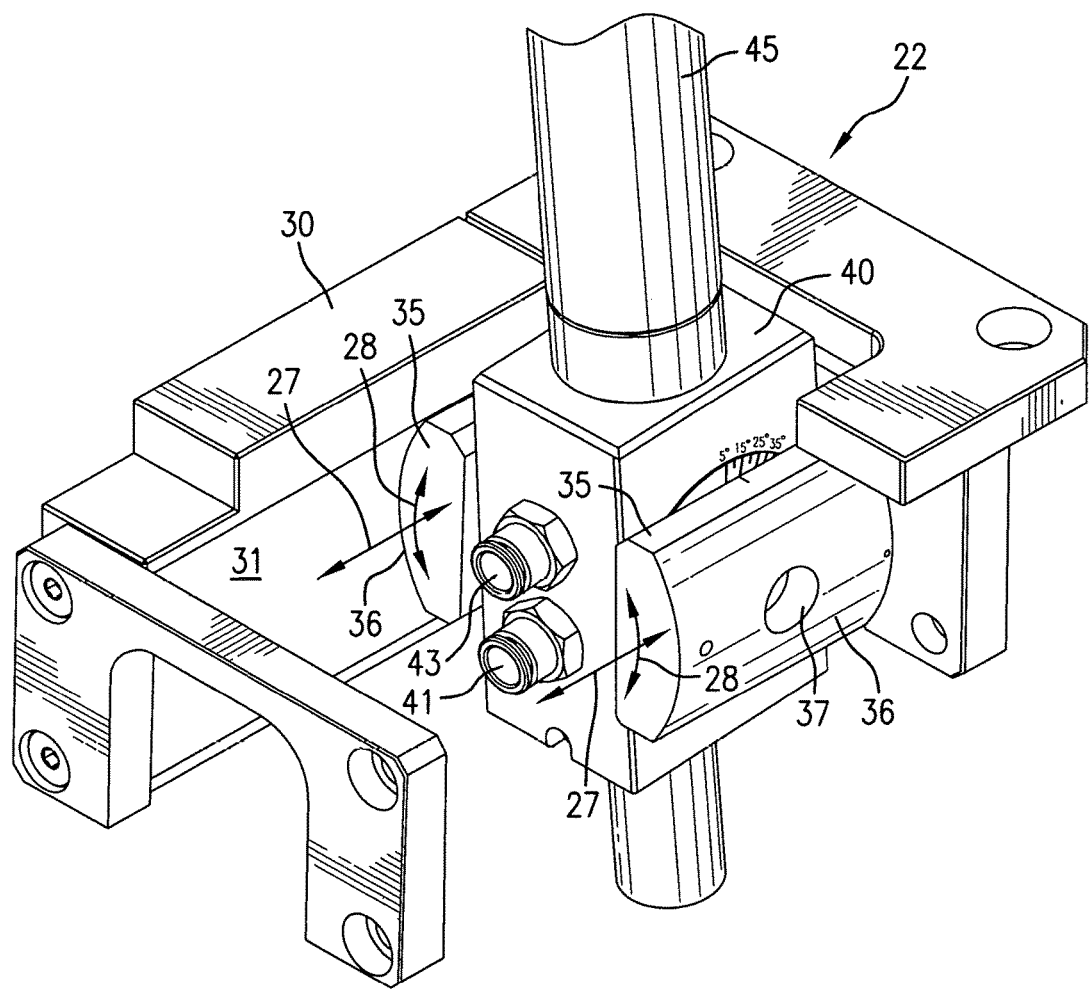
FIG. 4 shows a perspective view of a module or unit of a core lifter apparatus, shown in an example of a locked position at 5°, according to one embodiment of this invention.
Figure 5:
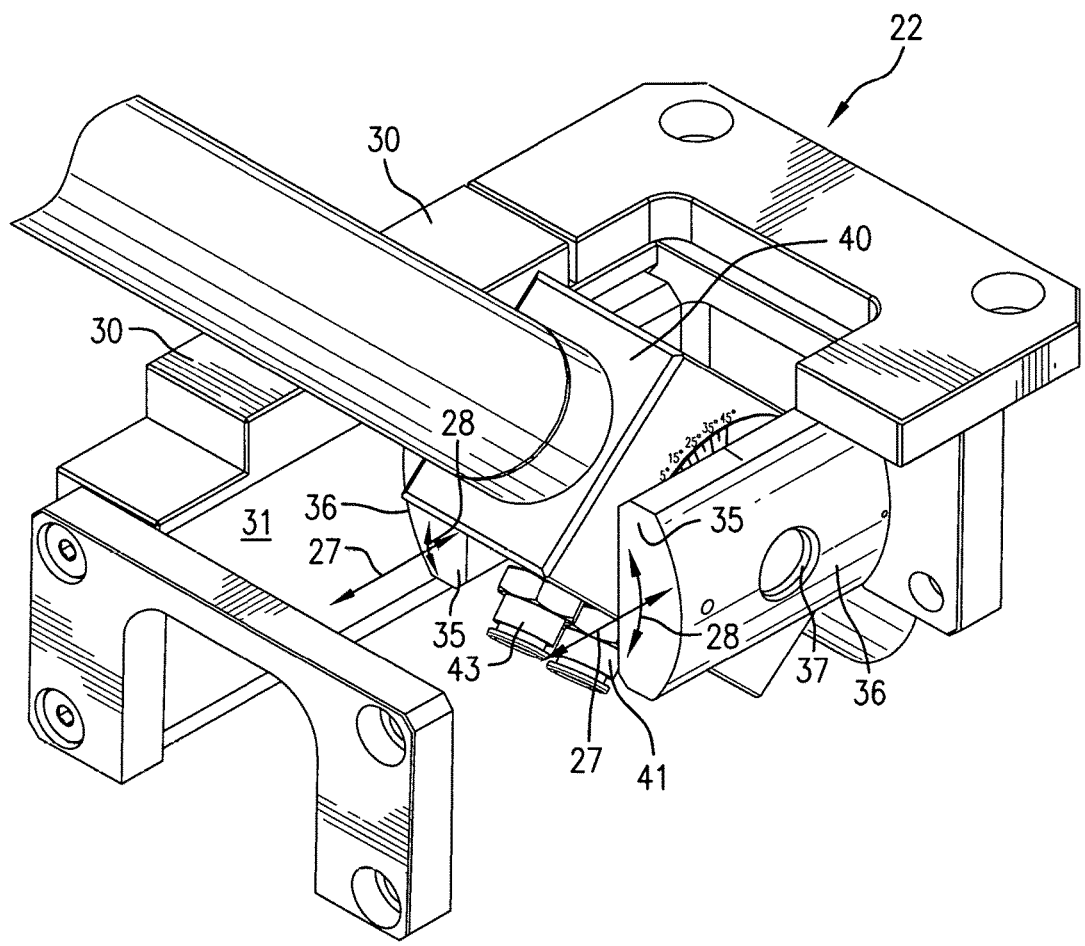
FIG. 5 shows a perspective view of the module or unit shown in FIG. 4, but in an example of a locked position at 45°.
Figure 9:
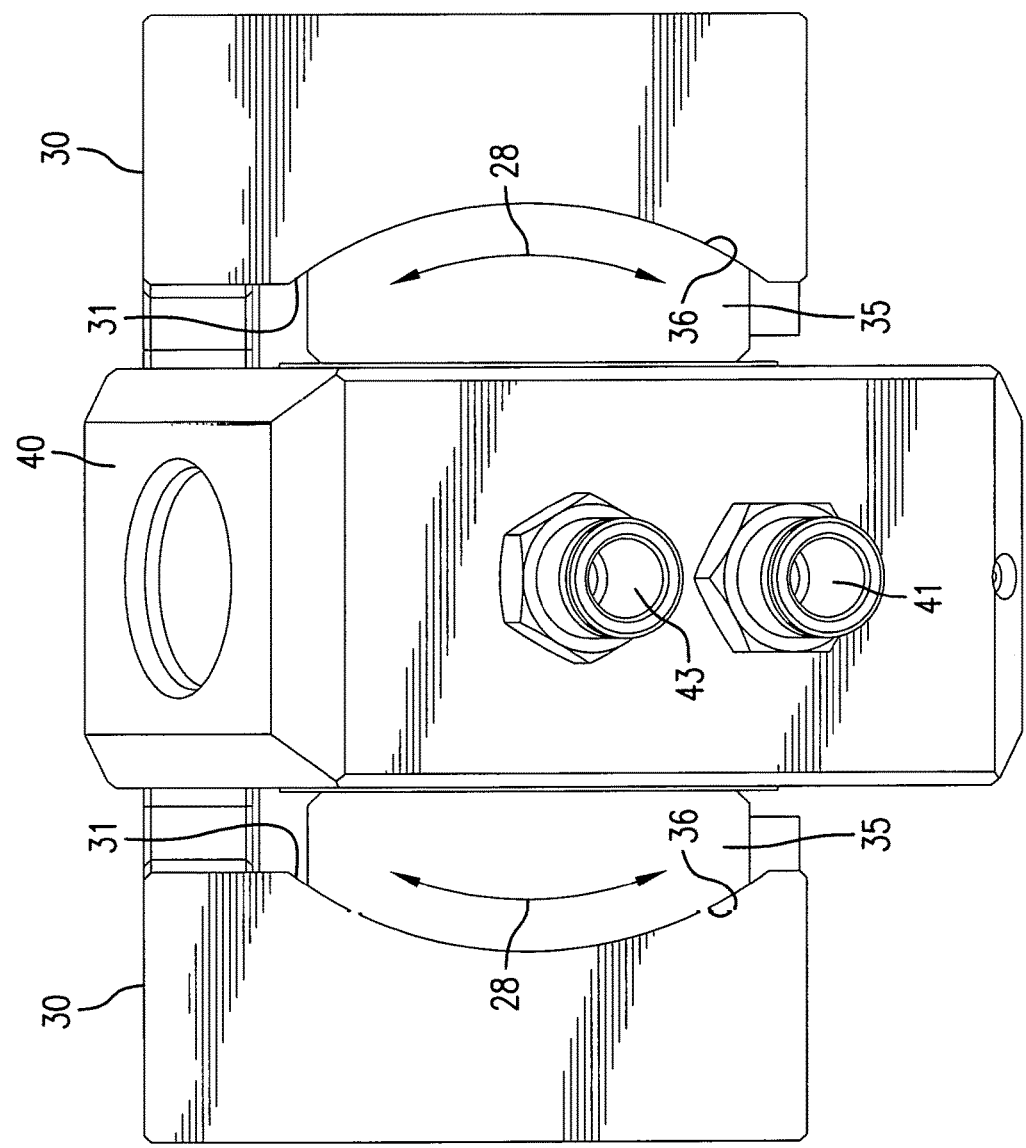
FIGS. 9-11 each shows a sectional view of a retainer, a slide and a gib, each in different relative positions reflecting the unevenness that occurs during the cycling of the mold, according to one embodiment of this invention.
Figure 10:
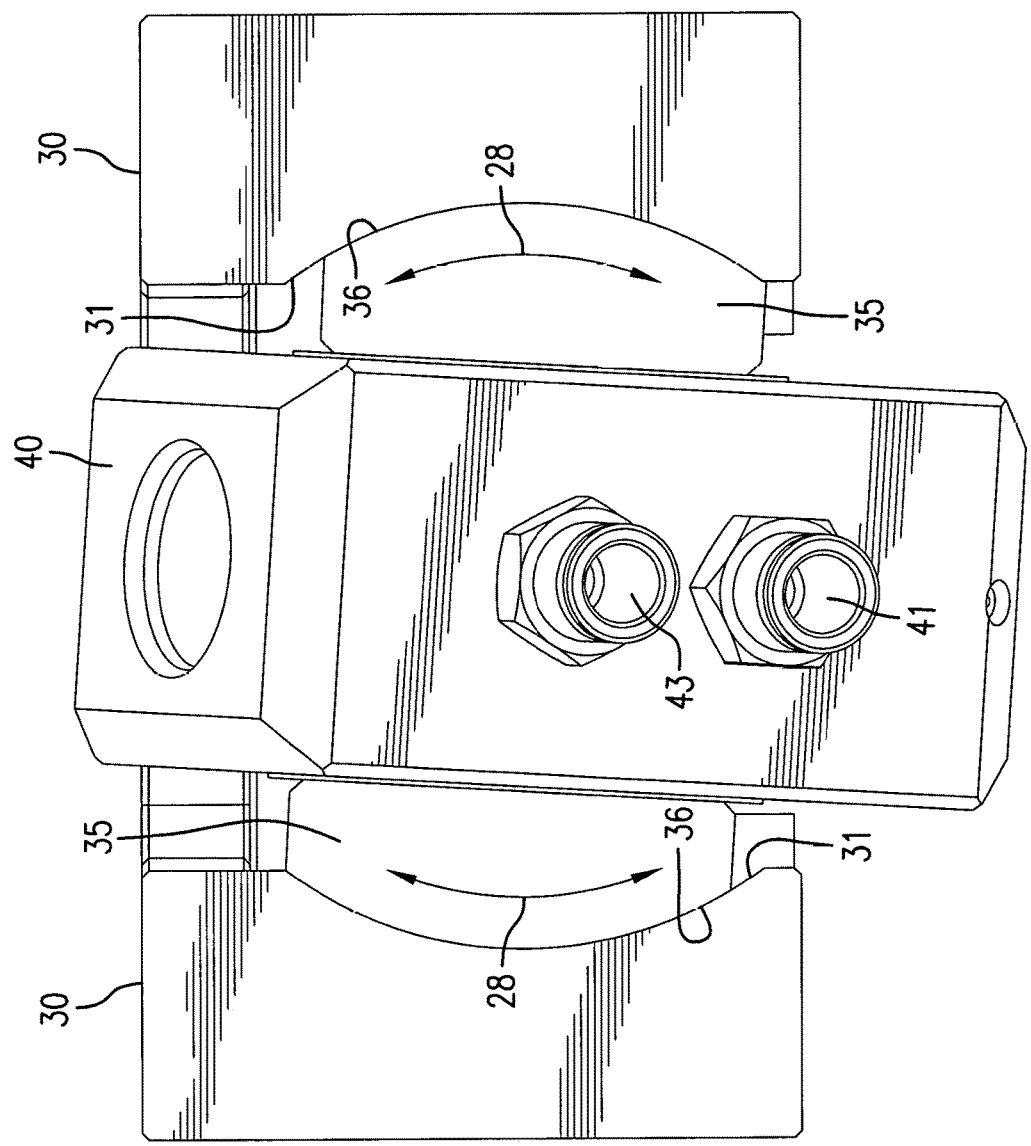
Figure 11:
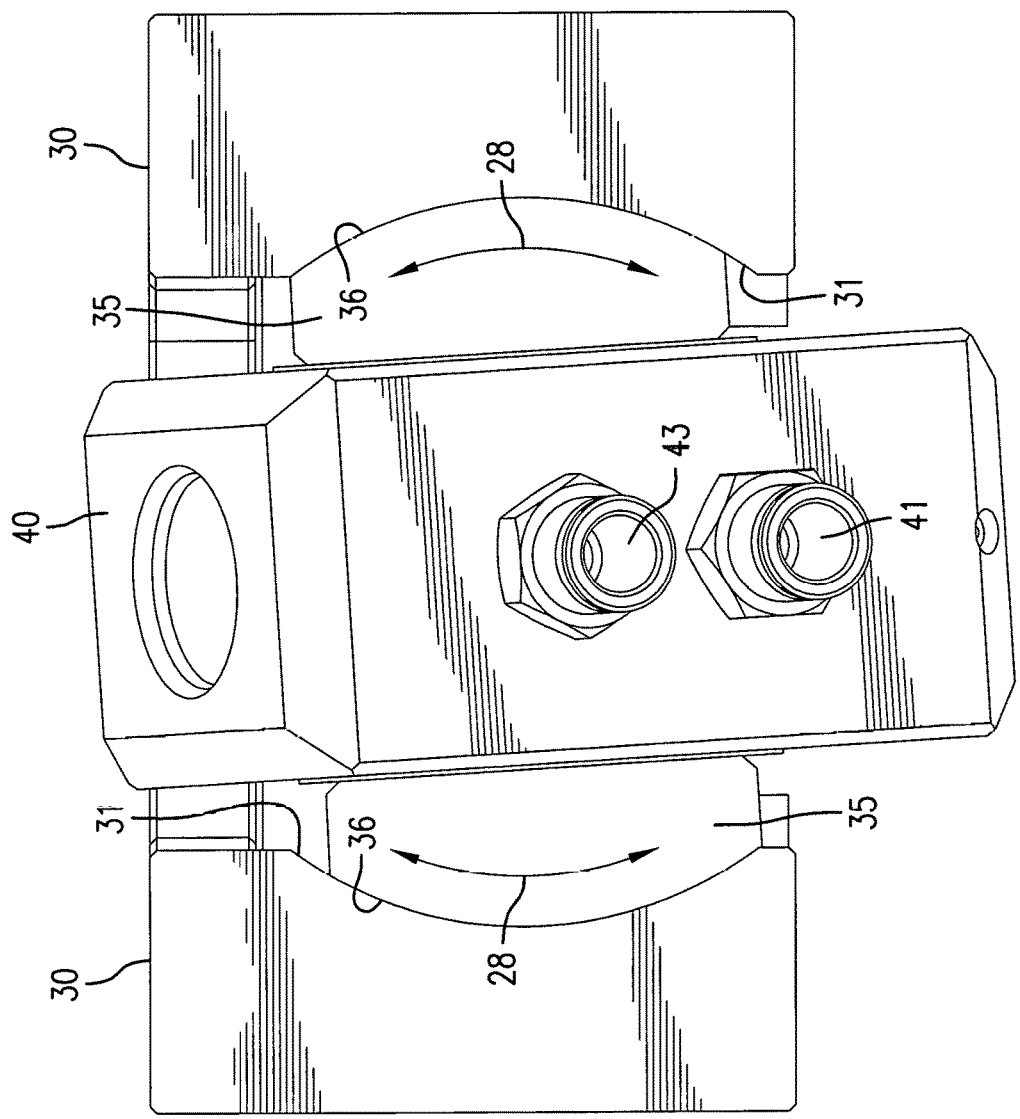
Figure 12:
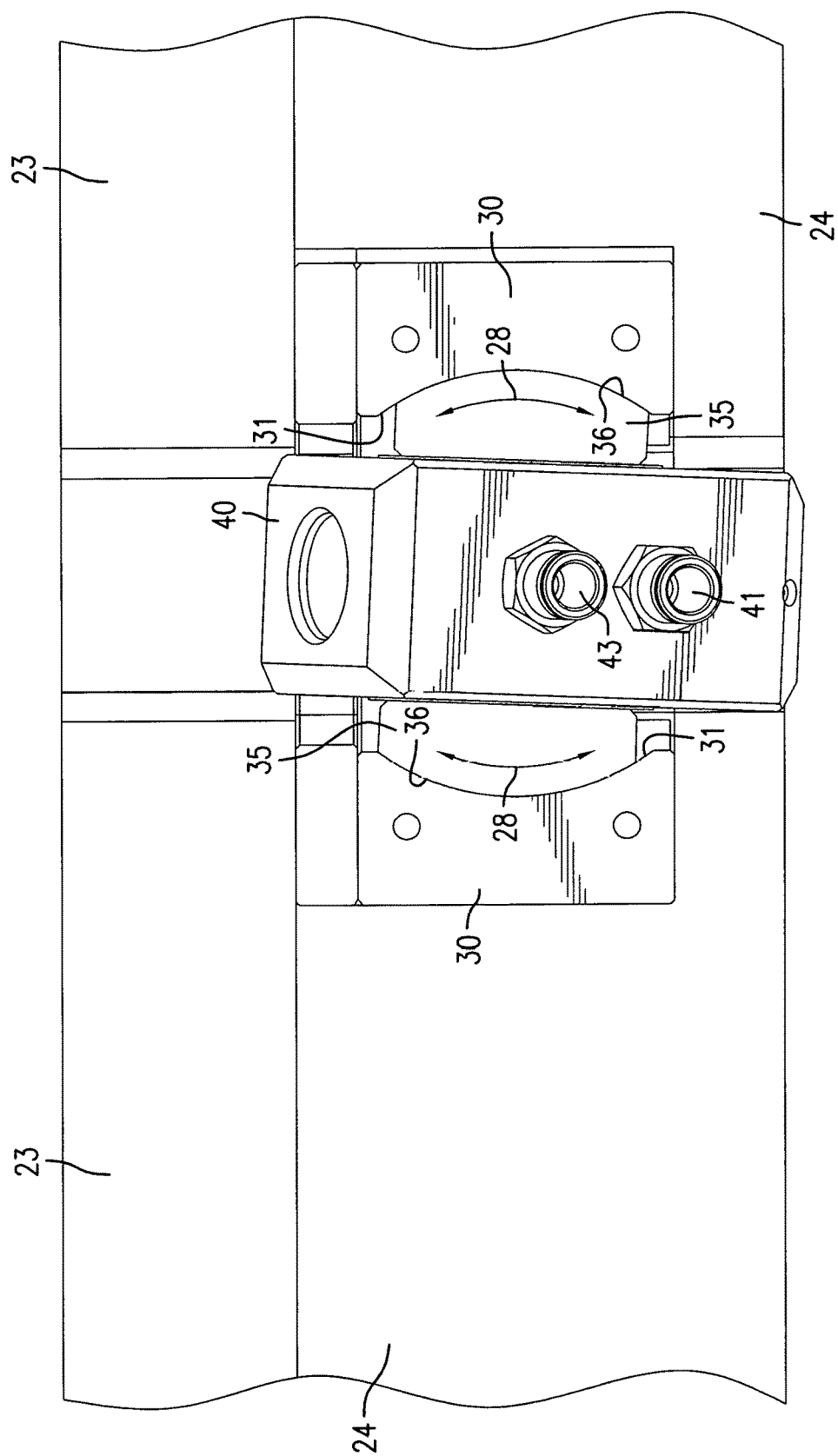
FIG. 12 shows a sectional view of a retainer, a slide and a gib, all mounted within an ejector plate, with the gib shown shifted within the ejector plate pocket to automatically adjust for the unevenness that occurs during the cycling of the mold, according to one embodiment of this invention.

FIGS. 4 and 5 show slides 35 able to move in linear direction 27 and/or rotational direction 28. A combination of linear and rotational movement of retainer 40 with respect to gib 30 and/or ejector plate 24, for example, allows retainer 40 to float and/or center itself within ejector plate 24. This movement can reduce or eliminate premature wear or product failure caused by interferences and stresses ultimately applied to lifter rod 45, for example, that are caused by misalignment of ejector plate 24. FIGS. 9-11 illustrate how retainer 40 can become misaligned with respect to ejector plate 24, for example, and how slides 35 of this invention can be used to move retainer 40 and thus rod 45 in linear direction 27 and rotational direction 28 to overcome reduced lifespans of retainer 40, lifter rod 45 and/or other connected elements.

FIGS. 4 and 5 show features of some embodiments of this invention in which gib 30 has inner surface 31 contacting outer surface 36 of slide 35. In some embodiments of this invention, inner surface 31 is concave and/or arcuate. In some embodiments of this invention, outer surface 36 is convex and/or arcuate. In other embodiments of this invention, inner surface 31 and/or outer surface 36 can have any other suitable shapes and/or dimensions that allow slide 35 and thus retainer 40 to move in linear direction 27 and/or rotational direction 28. As slide 35 moves with respect to gib 30, attached retainer 40 can have only linear movement, can have only rotational movement, or can have linear movement and rotational movement. As used throughout this specification and in the claims, the term linear movement is intended to relate to the movement in the direction of linear direction 27 as shown in FIGS. 4, 5 and 9-12, and, the term rotational movement is intended to relate to the movement in the direction of rotational, direction 28 as shown in FIGS. 4, 5 and 9-12, and any other suitable term can be used in place of or in addition to the term linear movement and/or the term rotational movement. In some embodiments of this invention, inner surface 31 slidingly and/or rotatably engages with outer surface 36 to move lifter rod 45 in linear direction 27, rotational direction 28 and/or any other suitable direction.

In some embodiments of this invention, slide 35 and retainer 40 move together between front position 46 and rear position 47, such as shown between FIGS. 2 and 3. According to some embodiments of this invention, lock 70 can be adjustable, lockable and/or releasable to releasably hold retainer 40 in rear position 47. Locking retainer 40 in rear position 47 positions the unit for accepting lifter rod 45 during installation when connecting retainer 40 with lifter rod 45. With such embodiments of this invention, it is possible for a maintenance person or user to change or replace lifter rod 45 without a need for the help of a second person moving retainer 40 to find the location of the incoming lifter rod 45. For example, this feature of this invention can eliminate the need for a second person to be positioned beneath the mold because retainer 40 itself holds lifter rod 45, particularly at rear position 47.

Depending on the particular mold design, lifter rod 45 can be set at a different angle or angular position, with respect to slide 35 and/or ejector plate 24, for example. Some embodiments of the module of this invention can accommodate lifter rod 45 mounted or secured in different relative positions, such as one or more angular positions. FIGS. 4 and 5 show one embodiment of the module according to this invention which can accommodate different set positions.

Figure 6:
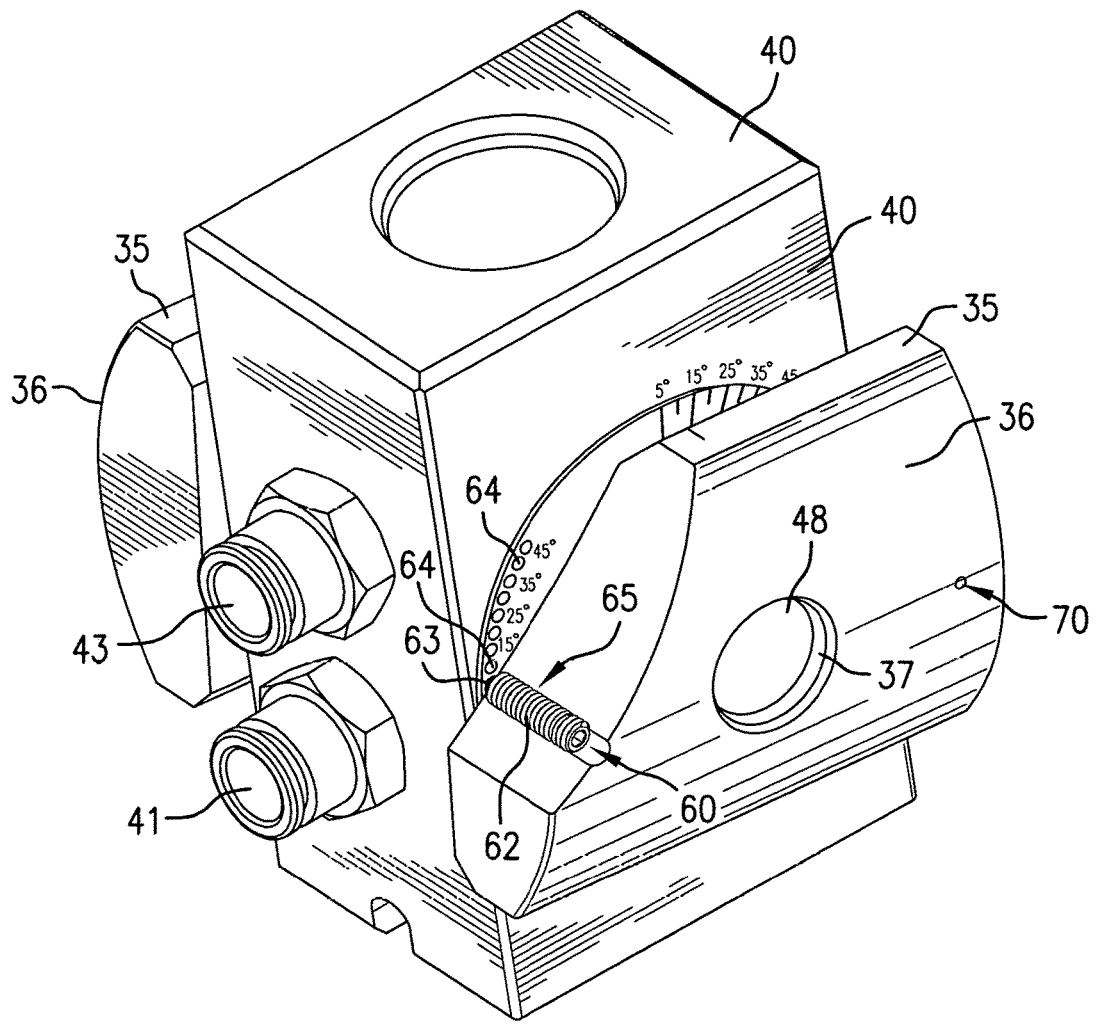
FIG. 6 shows a perspective enlarged sectioned view of a detent within the core rod retainer set at 15 degrees, and also shown are etched line indicators of the 15 degree position for the mold assembly person's viewability, according to one embodiment of this invention.

FIG. 4 shows retainer 40 positioned at a 5° angle with respect to slide 35 and/or ejector plate 24. FIG. 5 shows retainer 40 positioned at a 45° angle with respect to slide 35 and/or ejector plate 24. FIG. 6 shows an enlarged view of retainer 40 attached to two slides 35. FIG. 6 shows retainer 40 having pivot rod 48 matingly engageable with opening 37 of slide 35 which allows retainer 40 to pivot and/or otherwise move with respect to slide 35, according to some embodiments of this invention. In other embodiments of this invention, retainer 40 and/or slide 35 can have any other suitable connector and/or feature that allows retainer 40 to pivot and/or otherwise move with respect to one or more slides 35.

As shown in FIGS. 4-6, retainer 40 has markings to identify different set positions of retainer 40 with respect to slide 35. FIG. 6 shows the markings having 5° increments but other embodiments of this invention can have different increment sizes, shapes and/or features. FIG. 5 shows outer surface 36 of slide 35 having 5° increment markings and stop positions but other embodiments of this invention can have different increment sizes, shapes and/or features.

FIG. 6 shows positioning device 65 engageable to fix or secure a relative position of retainer 40 with respect to slide 35. In some embodiments of this invention, adjustable lock 60 comprises positioning device 65 that can be engaged and/or adjusted to engage bias element 62 which can have enough bias force to move plunger 63 into a corresponding receiver 64 and thus securely or fixedly hold the position of retainer 40 with respect to slide 35. The arrow representing adjustable lock 70, in FIG. 6, shows the location of adjustable lock 70, and in some embodiments of this invention, adjustable lock 70 can have a structure and function similar to or the same as the structure of adjustable lock 60. In some embodiments of this invention, bias element 62 comprises a coiled spring, such as shown in FIG. 6, but in other embodiments can also comprise any other suitable spring or other element that exerts a large enough force to hold the position of retainer 40 with respect to slide 35. In some embodiments of this invention, plunger 63 comprises a ball, a post and/or any other suitable element that can engage with receiver 64 and hold retainer 40. In some embodiments of this invention, receiver 64 comprises retainer 40 having one or more voids that correspond to or cooperates with plunger 63, for example, to hold the position of retainer 40 with respect to slide 35.

Figure 13:
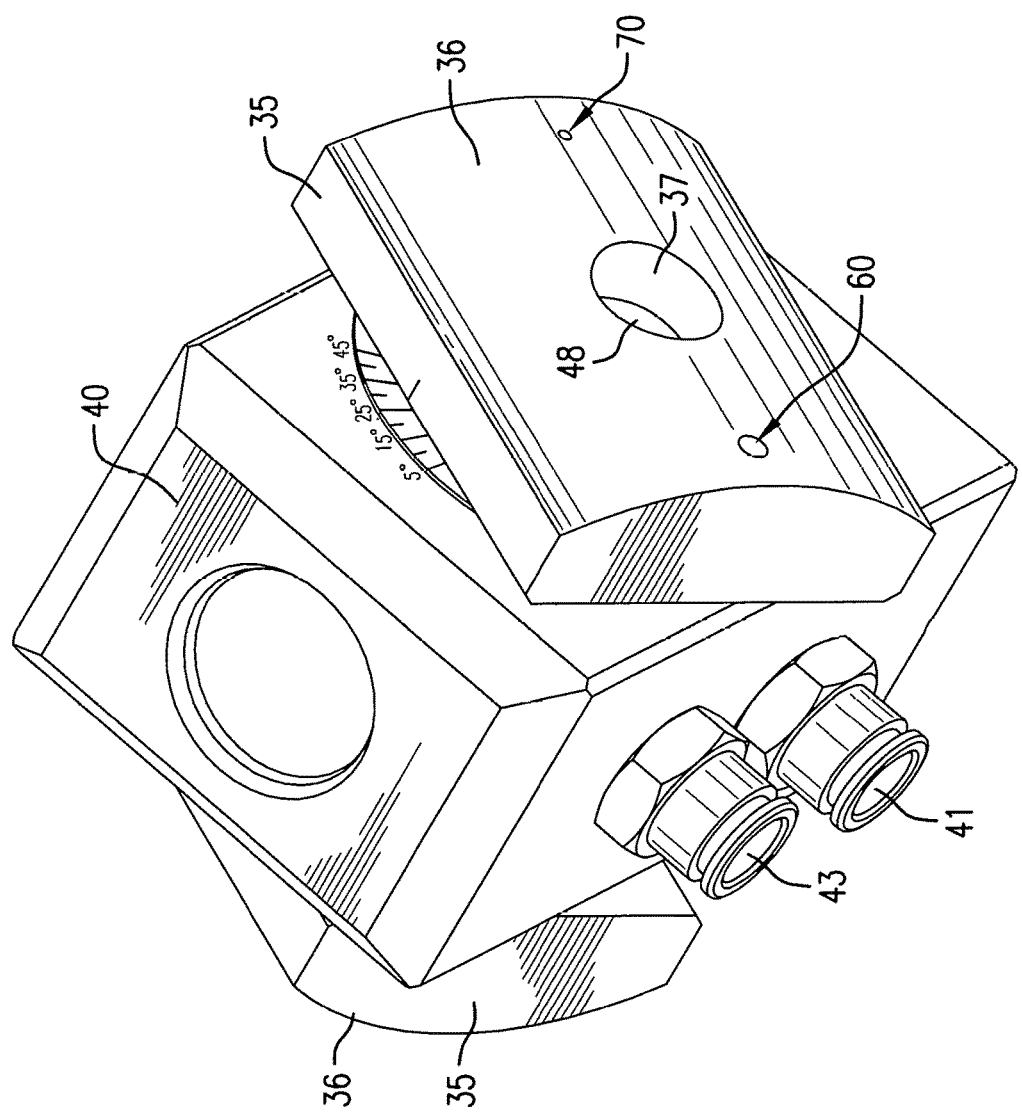
FIG. 13 shows a perspective view of a portion of a retainer and attached cooling fluid lines, according to one embodiment of this invention.
Figure 14:
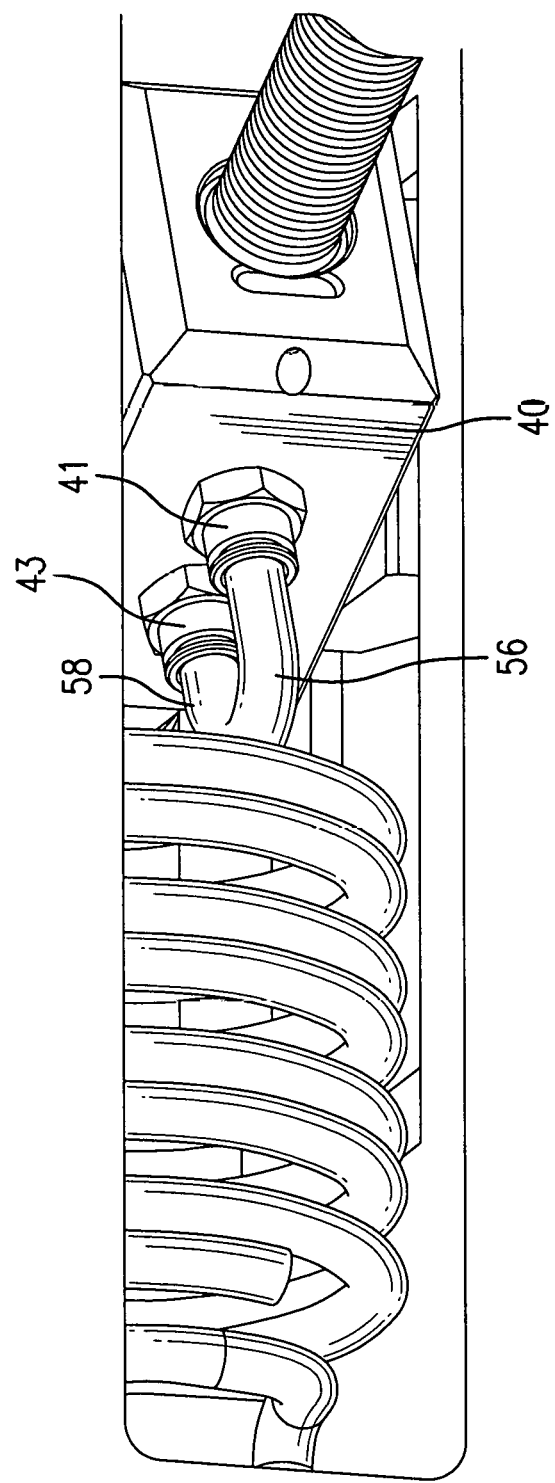
FIG. 14 shows a sectional view of a core lifter apparatus and its spacer for final tuning of the position within the mold, according to one embodiment of this invention.
Figure 15:
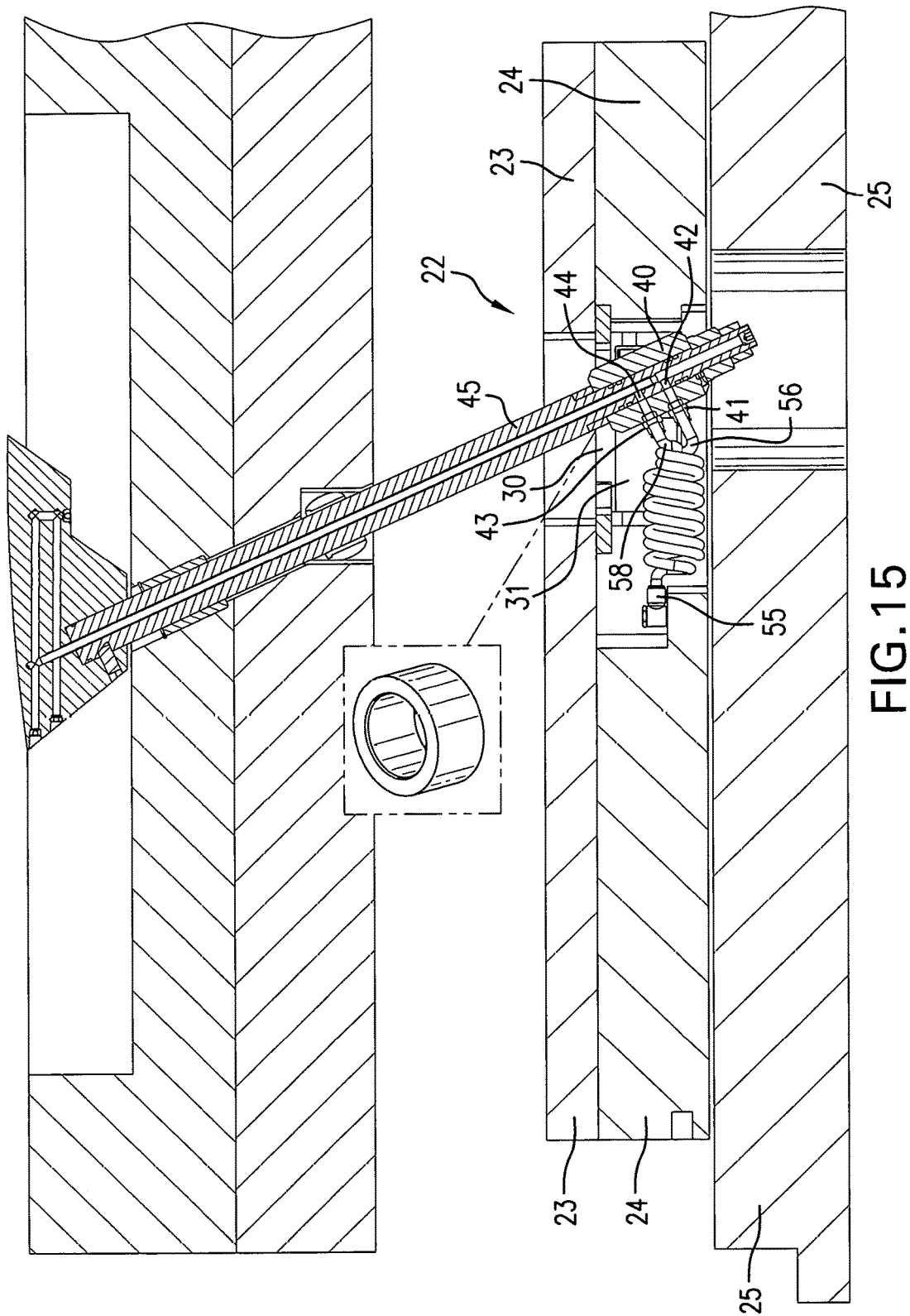
FIG. 15 shows a sectional view of a portion of a core lifter apparatus, according to one embodiment of this invention.
Figure 16:
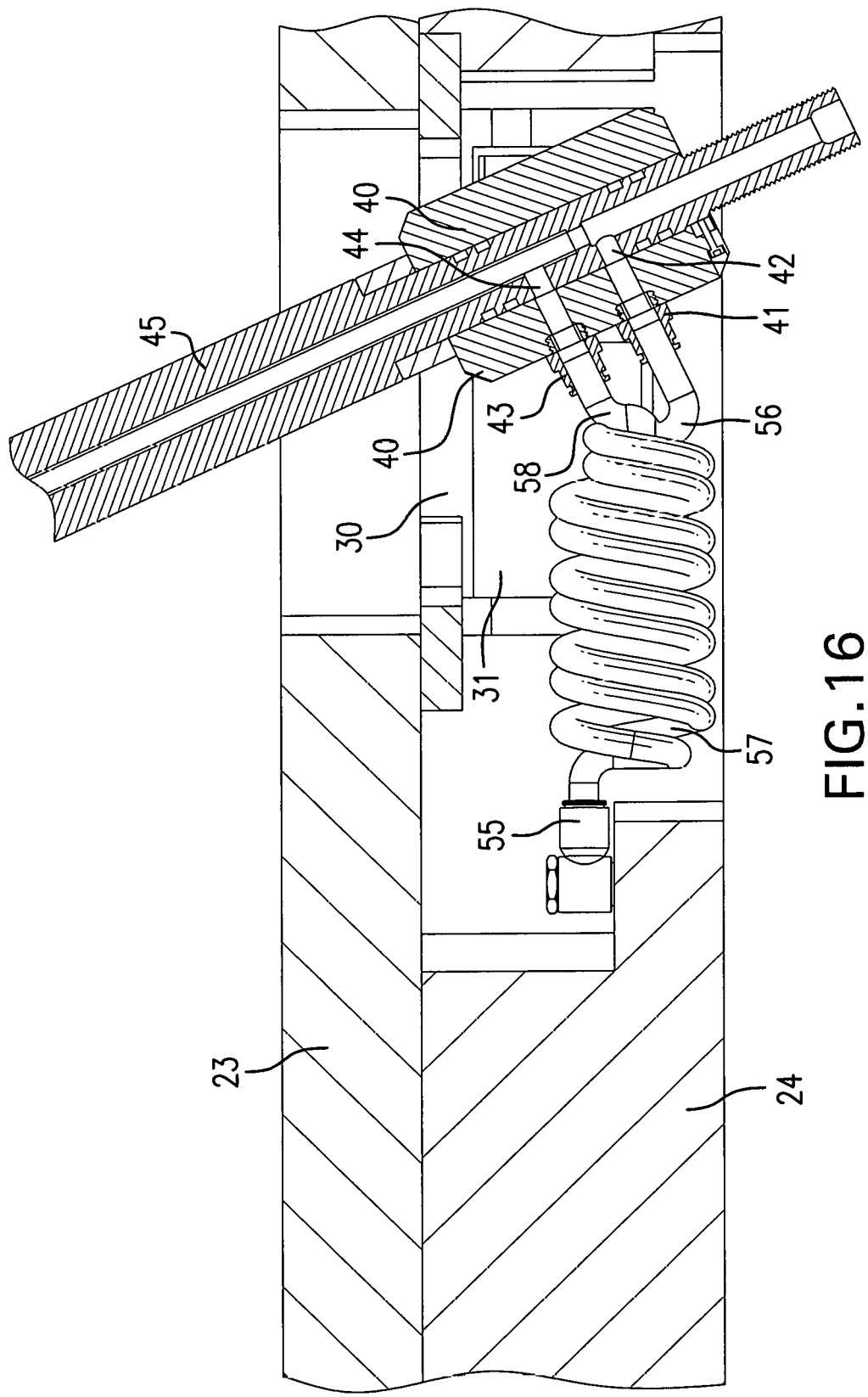
FIG. 16 shows a sectional view of a portion of a core lifter apparatus, according to one embodiment of this invention.

In some embodiments of this invention, such as shown in FIGS. 4 and 13, for example, retainer 40 comprises inlet 41 in communication with fluid, such as cooling fluid, furnished from cooling fluid supply 55 through cooling fluid supply line 56, and with supply channel 42, such as shown in FIGS. 14 and 15. Retainer 40 comprises outlet 43 in communication with fluid, such as cooling fluid, returned to cooling fluid return 57 through cooling fluid return line 58, and with return channel 44, such as shown in FIGS. 14 and 15. In some embodiments of this invention, retainer 40 and lifter rod 45 each forms or comprises supply channel 42 and/or return channel 44. Supply channel 42 and/or return channel 44 can be formed by any other suitable hose, line and/or structure.

FIGS. 13-15 show some embodiments of this invention in which cooling fluid supply 55 comprises a coiled cooling fluid supply line 56 and cooling fluid return 57 comprises a coiled cooling fluid return line 58. The coiled cooling fluid lines are flexible and particularly suitable for the spaces defined by ejector plate 24, such as shown in FIGS. 13-15, because retainer 40 moves between front position 46 and rear position 47, and during movement the coiled hoses or lines stay out of the way of other moving parts. In some embodiments of this invention, cooling fluid supply line 56 connects and forms communication with inlet 41 of retainer 40 and cooling fluid return line 58 connects and forms communication with outlet 43 of retainer 40. Any suitable mechanical and/or fluidic connection can be used to connect and form communication with inlet 41 and/or outlet 43.

What is claimed is:

1. A core lifter apparatus for a mold for molding plastic parts, the core lifter apparatus comprising:
   a gib mounted with respect to an ejector plate, a slide movably mounted to move in a linear direction and in a rotational direction with respect to said gib, a retainer attached to said slide, a lifter rod removably attached to said retainer, said slide and said retainer moving together between a front position and a rear position of said lifter rod, and a releasable lock releasably holding said retainer in said rear position during assembly.

2. The core lifter apparatus according to claim 1, wherein said gib has an inner surface contacting an outer surface of said slide.

3. The core lifter apparatus according to claim 2, wherein said inner surface of said gib is concave, said outer surface of said slide is convex, and said inner surface slidingly and rotatably engages with said outer surface to move said lifter rod in said linear direction during cycling of the mold.

4. The core lifter apparatus according to claim 1, further comprising said retainer having an inlet in communication with a cooling fluid supply and a supply channel within said lifter rod and an outlet in communication with a cooling fluid return and a return channel within said lifter rod.

5. The core lifter apparatus according to claim 4, wherein said cooling fluid supply comprises a coiled flexible supply line and said cooling fluid return comprises a coiled flexible return line.

6. The core lifter apparatus according to claim 1, further comprising an engageable positioning device fixing a relative position of said retainer with respect to said slide during assembly.

7. The core lifter apparatus according to claim 6, wherein said engageable positioning device comprises an adjustable lock holding said relative position of said retainer with respect to said slide.

8. The core lifter apparatus according to claim 6, wherein said relative position corresponds to an angular position of said lifter rod with respect to said slide.

9. A core lifter apparatus for a mold for molding plastic parts, the core lifter apparatus comprising:
   a gib mounted with respect to an ejector plate, a slide movably mounted with respect to said gib, an engageable positioning device adjustably moveable between a plurality of relative positions of a retainer with respect to said slide and said engageable positioning device fixing said retainer and said slide in one relative position of said relative positions, said slide and said retainer moving together between a front position and a rear position of said lifter rod, and a releasable lock releasably holding said retainer in said rear position during assembly.

10. The core lifter apparatus according to claim 9, wherein said slide moves in a linear direction as intended and should there be unevenness in plate movement in a rotational direction with respect to said gib.

11. The core lifter apparatus according to claim 9, wherein an inner surface of said gib is concave, an outer surface of said slide is convex, and said inner surface slidingly with said outer surface to move said retainer in said linear direction.

12. The core lifter apparatus according to claim 9, wherein said engageable positioning device comprises an adjustable lock selectively moving said retainer and said slide between said relative positions.

13. The core lifter apparatus according to claim 12, wherein said adjustable lock comprises a bias element normally urging a plunger into a locked position.

14. The core lifter apparatus according to claim 13, wherein said bias element is a spring.

15. A core lifter apparatus for a mold for molding plastic parts, the core lifter apparatus comprising:
   a gib mounted with respect to an ejector plate, a slide movably mounted with respect to said gib, a retainer attached to said slide, a lifter rod removably attached to said retainer, said retainer having an inlet in communication with a cooling fluid supply and a supply channel within said lifter rod and an outlet in communication with a cooling fluid return and a return channel within said lifter rod, and an engageable spring or detent positioning device fixing a relative position of said retainer with respect to said slide for during an installation step of connecting said lifter rod to said retainer.

16. The core lifter apparatus according to claim 15, wherein said cooling fluid supply comprises a coiled flexible supply line and said cooling fluid return comprises a coiled flexible return line.

17. The core lifter apparatus according to claim 15, wherein an inner surface of said gib is concave, an outer surface of said slide is convex, and said inner surface slidingly engages with said outer surface to move said retainer in a linear direction and if there is an unevenness in ejector plates also allows movement in a rotational direction with respect to said gib.

18. The core lifter apparatus according to claim 15, wherein said engageable positioning device comprises a spring or detent lock engaging and holding said relative position of said retainer with respect to said slide.

* * * * *